May 15, 1956  B. S. MASSEY  2,745,513
DEVICES FOR SEPARATING LIQUIDS FROM GASEOUS DISPERSIONS
Filed Nov. 19, 1951  3 Sheets-Sheet 1
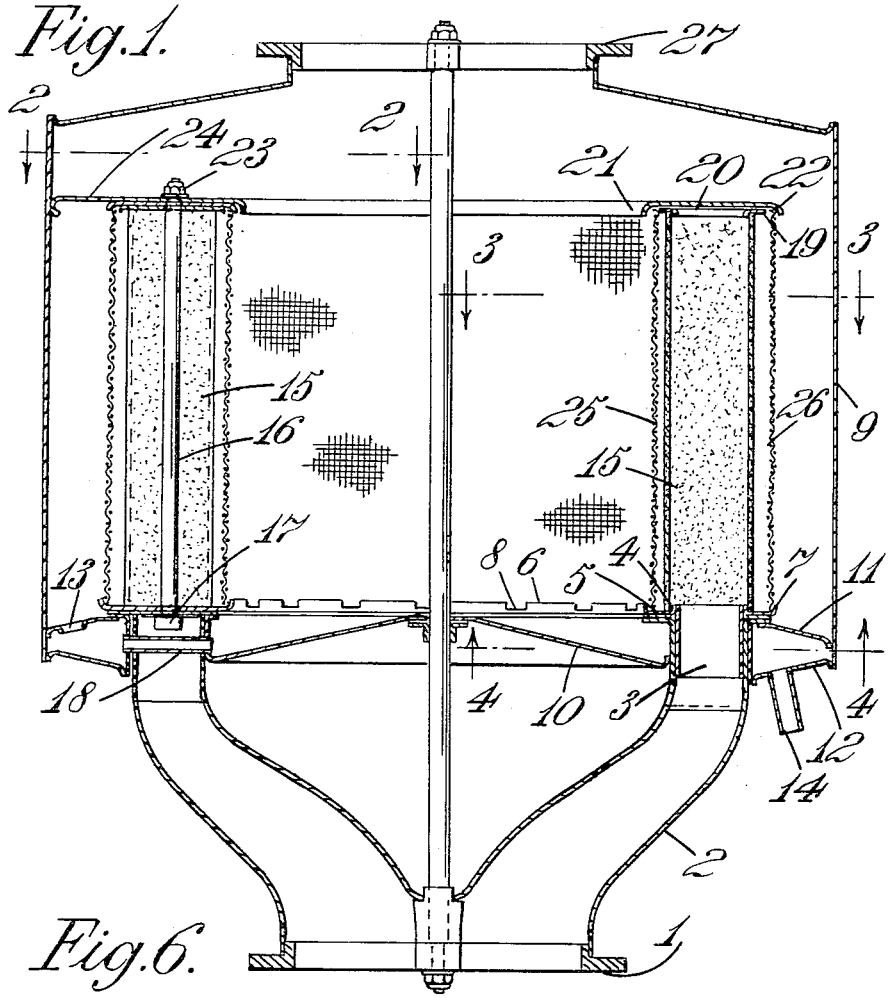
Fig.1.
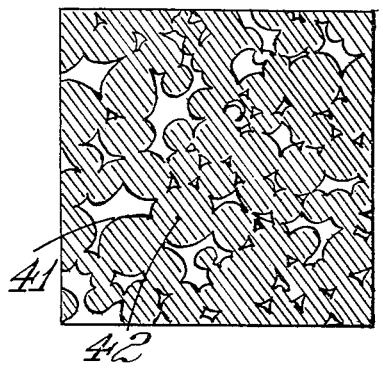
Fig.6.
Fig.7.
INVENTOR
BERNARD SIDNEY MASSEY
By Wilkinson & Mawhinney
ATTORNEYS

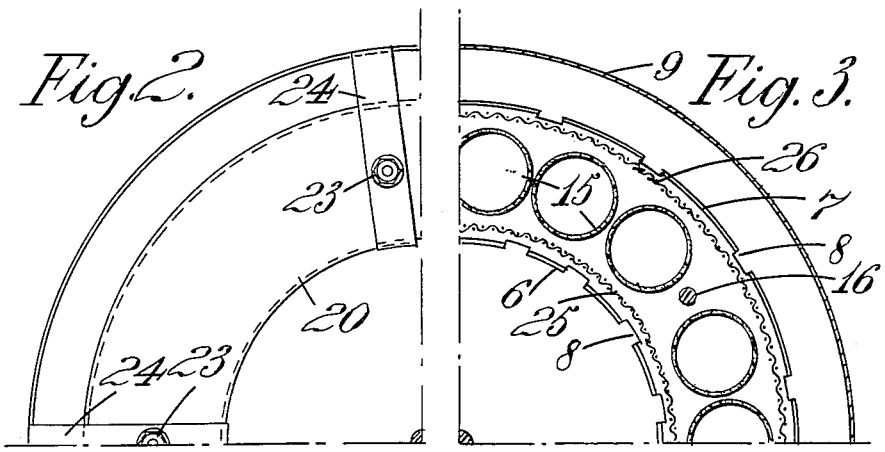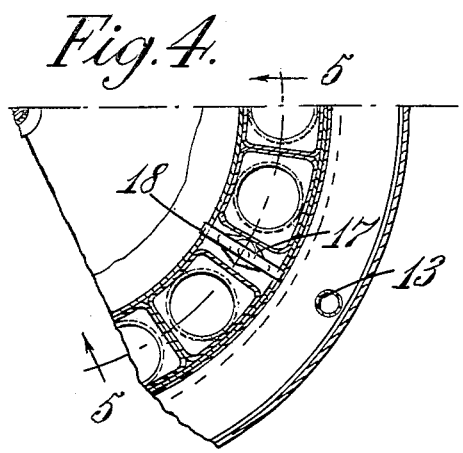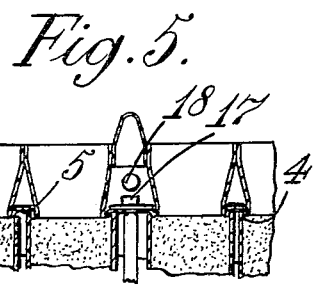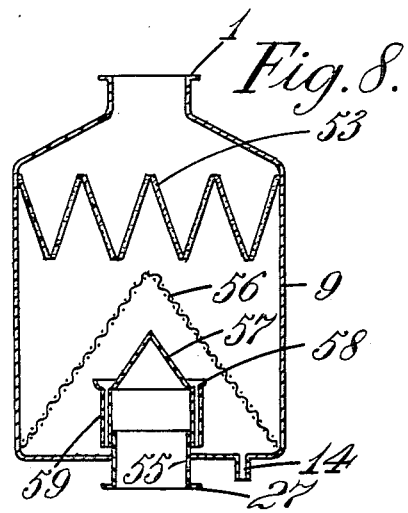

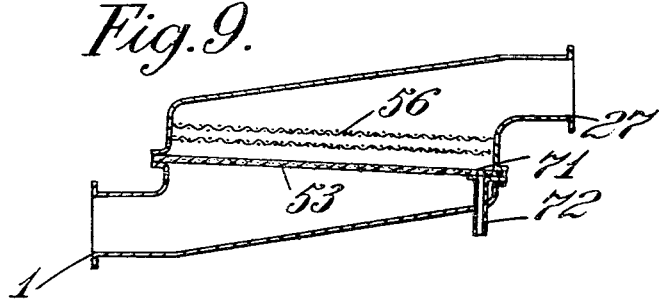
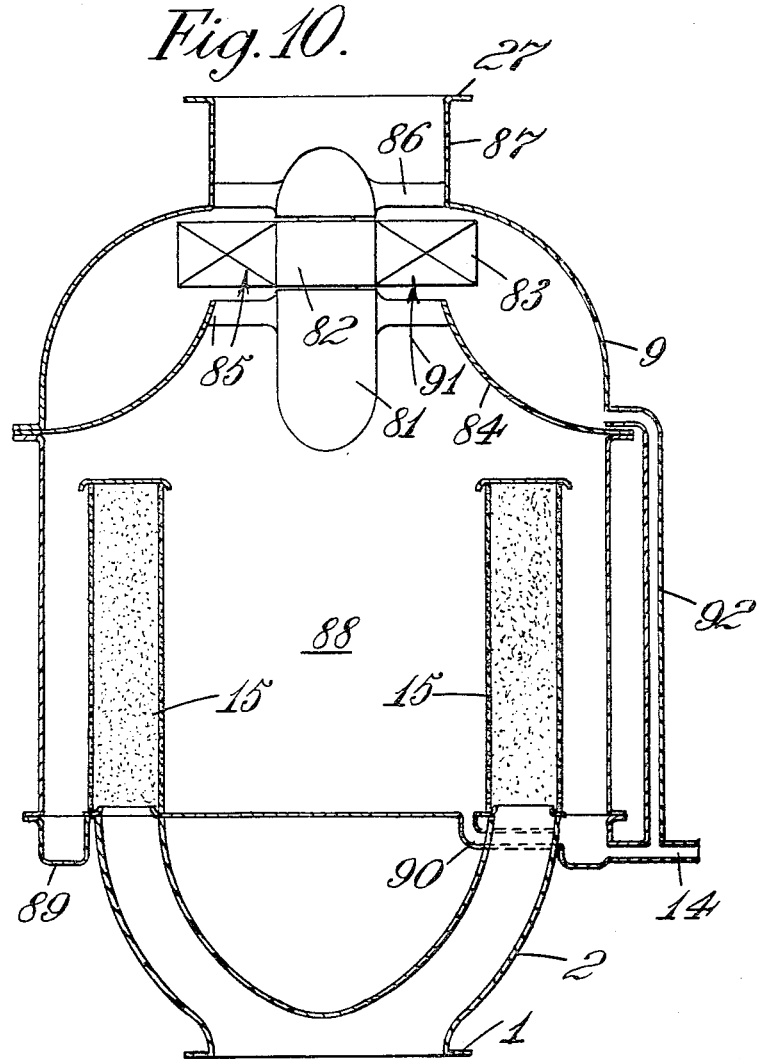

United States Patent Office 2,745,513
Patented May 15, 1956

2,745,513

DEVICES FOR SEPARATING LIQUIDS FROM GASEOUS DISPERSIONS

Bernard Sidney Massey, Bristol, England, assignor to The Bristol Aeroplane Company Limited, Bristol, England, a British company Application November 19, 1951, Serial No. 257,071

Claims priority, application Great Britain November 28, 1950

2 Claims. (Cl. 183—70)

It is known that in gaseous dispersions of liquids, commonly known as "fogs," the liquid is present in a very finely divided condition, the size of the water particles in an air-water fog, for example, having been estimated by one authority as of the order of 5 microns. Owing to this very small particle size the efficiency of separation by known devices utilising the effect of inertia or difference of density is comparatively low. It is known that such liquid particles can be removed by means of washing towers or the like, but on account of their bulk and weight such apparatus are unsuitable for many purposes, and more particularly for use in air-conditioning plants for aircraft, in which water fog frequently exists in the discharge from an expander type refrigerator unit.

In such air conditioning plants a reduction of cabin humidity is usually produced by cooling a part, or if necessary the whole, of the air-supply to a temperature well below the dew point so that a fog is produced, removing as much liquid water from the fog as conveniently possible, and then mixing the air with the other part of the supply, or with the air already in the cabin, with or without additional heat, so as to produce in the cabin the desired temperature and relative humidity. It is thus not necessary to remove the whole of the liquid phase from the fog, but on the other hand a high separation efficiency is desirable to reduce the proportion of the air supply requiring treatment since the production of the fog involves a considerable increase in the power absorbtion of the plant. In fact the highest loading on the plant usually occurs under these conditions requiring water separation for the reduction of cabin humidity. An improvement in separator efficiency is thus accompanied by a useful saving in power and size of plant.

The principal object of the invention is to provide means for separating out water in an air-conditioning plant of the kind referred to, but it is clear that the device can be used for separating out water in other types of plant, or more generally for separating liquid from any gaseous dispersion of the same.

A further object of the invention is to effect the separation in two stages, namely firstly to cause a coalescence of the very small liquid particles into larger particles or droplets and then to separate out the droplets by means employing the effect of inertia or difference of density. By inertia effect is meant that obstacles are arranged in the path of the dispersion, the droplets striking against them by reason of their momentum and being absorbed into a liquid surface layer while the gas passes around the obstacle. In distinction to this action, separation by difference of density involves stratification of the flow of gas by a force such as gravity or centrifugal force. Obviously these effects can be combined in the same apparatus, that is to say a layer rich in liquid droplets may be formed and the droplets then caught upon obstacles. It has been found that the preliminary coalescence of the small particles into droplets sufficiently large to be amenable to separation by the methods described can be effected by passing the dispersion through a porous diaphragm with tortuous pore-passages of suitable dimensions.

The separating device according to the invention essentially comprises a casing divided into an entry chamber and an exit chamber by a porous diaphragm with tortuous pore-passages of such dimensions as to cause coalescence of liquid fog particles forced therethrough, means in or associated with the exit chamber for separation of liquid droplets from the gaseous phase by the effect of inertia or difference of density, or a combination of these effects, and means for collecting and removing the separated liquid.

The invention also includes the method of separating liquid from a gaseous dispersion of the same which comprises passing a stream of the dispersion through tortuous pore passages of such dimensions as to cause coalescence of particles of the liquid into larger droplets and then separating the droplets from the dispersion by the effect of inertia or difference of density or a combination of these effects.

Further features of the invention will be apparent from the following description and the accompanying drawings illustrating various embodiments of the invention given by way of example.

In the drawings

Figure 1 is an axial section through an upward-flow arrangement of separator according to the invention, Figures 2, 3 and 4 are partial sections along the lines 2—2, 3—3 and 4—4 respectively in Figure 1, while Figure 5 is a partial developed section along the line 5—5 in Figure 4.

Figure 6 is a section illustrating the nature of a material suitable for the coalescing diaphragm, while Figure 7 shows an alternative construction of such a diaphragm.

Figure 8 shows diagrammatically in section a downward flow arrangement of separator.

Figure 9 similarly shows an arrangement in which a film of liquid is maintained on the diaphragm, while Figure 10 shows an upward flow arrangement embodying a centrifugal separator for the coalesced droplets.

The arrangement shown in Figures 1 to 5 inclusive comprises an inlet flange 1 attached to a manifold 2 having seventeen circular outlets 3 arranged in a circle and attached to the flanges 4 of upwardly flanged holes in a flat annular plate 5. The inner and outer edges of the plate also have upward flanges 6 and 7 provided with cut out portions 8. The manifold and plate are supported in the lower part of a cylindrical casing 9 by an inner conical sheet metal member 10 and by upper and lower frusto-conical members 11 and 12 respectively, the member 11 being provided with drain holes 13 and the member 12 with a drain connection 14 respectively. The flanged holes 4 are arranged in two groups of four and three groups of three, the holes in each group being closely spaced to allow merely sufficient space for tubes 15 to pass over the upturned flanges, while between the groups somewhat more space is allowed to permit support pillars 16 to pass between adjacent tubes 15 and screw into anchor nuts 17. In these larger spaces drain tubes 18 are provided extending between the inner and outer walls of the manifold 2 so that water collecting on the conical plate 10 can pass to the outlet 14. The tubes 15 are held in place at their top ends by a flat annular plate assembly comprising a lower member 19 provided with downwardly flanged holes 20 locating the tubes and an upper member provided with inner and outer downwardly flanged edges 21, 22. The assembly is retained in place by nuts 23 threaded upon the upper ends of the pillars 16. The nuts 23 also serve to secure steadying strips 24 bearing against the outer casing 9. The flanges 6, 21 and 7, 22 serve to retain inner and outer screens 25, 26 each composed of six turns of coarse mesh wire gauze secured together at suitable intervals with binding wire. Wire gauze having eight meshes per linear inch and formed from 0.028 inch diameter wire has been found satisfactory for these screens. The gauze may be set so that the wires run vertically and horizontally as shown, or if desired the screens may be composed wholly or mainly of vertical members and these may be somewhat larger in diameter so as to provide a more protected lee side down which the water film may run. However, at the comparatively low air speeds envisaged in the construction shown, gauze screens as described give good separation efficiencies. The top of the casing is provided with an outlet flange 27 and a frusto-conical end 28.

In operation the air-fog enters by the flange connection 1 and is directed by the manifold 2 into the interiors of the tubes 15. To keep the loss of head at the inlet to a minimum care has been taken, as will be seen more particularly from Figure 5, to provide faired entrances to the tubes 15. The fog passes through the walls of the tubes 15, which are of porous material, and the small particles are thereby caused to coalesce to form larger particles. Some of these are absorbed in a liquid layer which runs down the outside of the tubes and others are carried away by the air and are caught upon the screens 25, 26, forming thereon droplets or films which trickle downwardly and are collected in the bottom of the casing, from which the water may be drawn off through the drain 14.

The tubes 15 are preferably of material made of metal particles of substantially spherical form closely compacted and caused to adhere by a sintering process. The resulting material is characterized by a multiplicity of tortuous pore-paths with many enlargements and contractions, there being no straight through paths from side to side provided that, as will invariably be the case in consequence of mechanical strength requirements, a sufficient thickness of the material is taken. In this respect the material differs from simple gauze however fine the mesh of the latter may be. The nature of the material is illustrated in Figure 6 which is a greatly enlarged section through a portion of the material. The irregularly shaped pores 41 communicate with others in parallel sections to form tortuous passages through the material, the maximum size of particle which can pass through being determined by the size of the spherical particles such as 42. Material of this nature is obtainable commercially in various grades defined by the size of the largest particle which can pass through. For reasons of mechanical strength the minimum thickness of diaphragms of the coarser grades has to be greater than that of the finer grades, so that in choosing a grade of this particular application regard must be paid to the fact that whereas the pressure drop through the material decreases with increasing pore size, the largest pore size which will produce effective coalescence is not necessarily the best to use, since the greater thickness of the diaphragm may more than compensate for this effect. For a given permissible pressure drop and specific flow through the diaphragm it is preferred to make the thickness of the latter and the pore size, as determined by the size of the particles, a minimum consistent with adequate mechanical strength, this also gives the minimum weight of diaphragm material, which is an important factor in a component for use in aircraft. In a particular case the tubes 15 of a separator as shown in Figure 1 have been made of porous bronze material 0.125 inch thick and with a pore size to pass 0.0015 inch maximum particle size. This separator had an efficiency of about 75% for fogs having a liquid water content above a value of about 0.8% (56 grains per pound). As the liquid water content was reduced the efficiency fell and was about 50% at a water content of 0.3%. Pressure drop through the separator increases with increasing liquid water content but tends towards a maximum, the rate of change being comparatively small for liquid water contents above 0.8%. At its designed mass flow the separator caused a pressure loss of about 0.75 pound per square inch with a liquid water content of 0.8% and an air density of about .081 pound per cubic foot.

This form of separator also has a very marked silencing effect, so much so that in the particular case referred to the silencer provided in the air conditioning plant to reduce compressor noise became unnecessary and was removed, thereby making available more space for the separator and saving weight and pressure loss.

Instead of using bronze particles for the porous diaphragm, other metals, such as stainless steel, or non metallic materials such as glass or vitreous substances may be used, it being necessary that the material should be resistant to corrosion by the fog to be treated. Moreover it is not essential that the particles should be bonded together, since they could be retained between porous members such as wire gauze. Such an arrangement is illustrated in Figure 7, the two gauzes being shown at 45 and 46 and the filling of approximately spherical particles at 47.

Figure 8 shows an arrangement in which the fog enters a rectangular casing 9 by an upper flange connection 1 and passes downwardly and laterally through a porous diaphragm 53 arranged in zig zag formation. At the bottom of the casing an outlet connection 27 has a coaming 55 projecting upwardly into the casing. A screen assembly 56 of penthouse roof form is provided to catch the coalesced droplets and may be constructed either of coarse mesh gauze as described in connection with Figure 1 or of rods or tubes down which the liquid may run on the lower, lee, side. To prevent drops falling through the outlet, this is covered by a deflector 57 having a gutter 58 and supported from the coaming by drain tubes 59. An outlet connection 14 permits the collected liquid to be drawn off.

In Figure 9 an arrangement is shown in which the fog enters an inlet casing at 1 passes upwardly through a porous diaphragm 53 and a droplet catching screen 56 and leaves an outlet casing at 27. The diaphragm is inclined downwardly slightly towards the right hand side, where it is provided with one or more drain holes 71 registering with a collecting and drainage system 72 forming part of the inlet casing. In this way a thicker film of water is maintained on the downstream side of the diaphragm than is possible with the other arrangements described and assists the trapping of the water particles passing through the diaphragm.

Figure 10 shows another alternative arrangement which is similar to that of Figure 1 in that it comprises an inlet manifold 2 leading to a ring of porous tubes 15. Instead of the droplet-catching screens however, a centrifuging device is provided in the upper part of the casing 9. This comprises a motor 81 driving an impeller 82 having radial blades 83. The motor is supported from a conical deflector 84 by a spider 85 and also by a spider 86 from the outlet duct 87. Some of the coalesced droplets fall to the bottom of the casing 9 by the effect of gravity in the space 88, where the air velocity is low, and are drained off into the annular sump 89 through the tube 90. The remaining fog passes in the direction of the arrows 91 through the spider 85 and the impeller blades 83, and the rotation thereby imparted causes the heavier droplets to be thrown outwardly by centrifugal force against the curved wall of the casing 9 to run down into the space between the wall and the deflector 84. From this space the water is taken by a tube 92 into a common drain connection 14.

I claim:

1. A water separator for an air conditioning plant for separating water from a gaseous dispersion of the same, said device comprising an entry chamber, a plurality of tubular diaphragm elements, which elements have walls composed of an agglomeration of adherent solid particles of a substance resistant to corrosion by the liquid, the agglomerated particles defining tortuous pore-passages through said walls of such dimensions as to cause coalescence into droplets of dispersed particles when forced therethrough while maintaining the least possible thickness constant with adequate mechanical strength of the tubular elements, said entry chamber commmunicating with the interior of all said tubular elements, and said tubular elements together presenting a flow path which is not materially restricted over the flow path through said entry chamber, and exit chamber, means supporting said tubular elements within said exit chamber, a plurality of concentric layers of gauze embracing said diaphragm elements and forming an annular space for separation of liquid droplets from the dispersion medium, means supporting said layers of gauze within said exit chamber in the path of the gaseous dispersion emerging from said walls, means in said exit chamber for collecting liquid draining from said layers of gauze, and means for removing drained liquid from said collecting means.

2. A water separator for an air conditioning plant for separating some of the water from a gaseous dispersion of the same having a low rate of flow without substantial loss of pressure in the dispersion comprising an entry chamber for the dispersion, an exit chamber for the dispersion, a tubular porous diaphragm positioned between said chambers through which the dispersion is adapted to pass and comprising a mass of closely compacted substantially spherical particles of a solid substance, said particles being arranged to provide tortuous pore-passages therethrough of such dimensions as to permit the flow of the dispersion therethrough without any substantial change in its flow rate and pressure and to cause coalescence into droplets of dispersed particles of the water, and means associated with said exit chamber for separation of said water droplets from the gaseous dispersion comprising a plurality of layers of gauze surrounding said tubular diaphragm.

References Cited in the file of this patent

UNITED STATES PATENTS

| | | |
|---|---|---|
| 1,099,773 | Smith | June 9, 1914 |
| 1,544,950 | Smith | July 7, 1925 |
| 1,714,825 | Stephan | May 28, 1929 |
| 2,048,718 | Wemhoener | July 28, 1936 |
| 2,048,993 | Claffey et al. | July 28, 1936 |
| 2,220,641 | Davis | Nov. 5, 1940 |
| 2,297,817 | Truxell et al. | Oct. 6, 1942 |
| 2,359,386 | Reinsch | Oct. 3, 1944 |
| 2,400,076 | Dauster | May 14, 1946 |
| 2,521,785 | Goodloe | Sept. 12, 1950 |
| 2,554,343 | Pall | May 22, 1951 |

FOREIGN PATENTS

| | | |
|---|---|---|
| 425,413 | Great Britain | Mar. 11, 1935 |